US006219830B1

(12) United States Patent
Eidt et al.

(10) Patent No.: US 6,219,830 B1
(45) Date of Patent: Apr. 17, 2001

(54) RELOCATABLE OBJECT CODE FORMAT AND METHOD FOR LOADING SAME INTO A COMPUTER SYSTEM

(75) Inventors: Erik L. Eidt, Campbell; Alan W. Lillich, Los Gatos, both of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 08/035,750

(22) Filed: Mar. 23, 1993

(51) Int. Cl.[7] ................................. G06F 9/45; G06F 9/34

(52) U.S. Cl. ................................. 717/5; 717/10; 717/11; 710/68

(58) Field of Search .................................... 395/800, 575, 395/375, 500, 775, 700, 725, 710, 712, 705; 364/DIG. 1, DIG. 2; 710/68; 717/10, 11, 5

(56) References Cited

U.S. PATENT DOCUMENTS

| 4,351,024 | * | 9/1982 | Bradley et al. ....................... 395/650 |
| 5,175,856 | * | 12/1992 | Van dyke et al. .................... 395/700 |
| 5,193,180 | * | 3/1993 | Hastings ............................... 395/575 |

OTHER PUBLICATIONS

"IEEE Standard Microprocessor Universal Format for Object Modules (IEEE Std 695–1990)", IEEE Computer Society (Feb. 29, 1991).

Braga, et al., "A Portable Linking Loader", Symposium on Trends and Applications 1976: Micro and Mini Systems, IEEE Computer Society (May 27, 1976), pp. 124–128.

Presser, Leon, and White, John R., "Linkers and Loaders", ACM Computing Surveys (Sep. 1972), vol. 4, No. 3, pp. 149–167.

Kanai, et al., "The Concept and Implementation of Standard Object Module Format for Microprocessors (SYSROF–E)", Proceedings of the 1986 International Conferene on Industrial Electronics, Control and Instrumentation (Sep. 29, 1986), vol. 2 of 2, pp. 839–844.

"Inter–Linkage Function Invocation Method", IBM Technical Disclosure Bulletin (Sep. 1992), vol. 35, No. 4B, pp. 44–49.

"EXE Format for 32–Bit Personal Computer Systems", IBM Technical Disclosure Bulletin (Sep. 1992), vol. 34, No. 3, pp. 363–365.

Garitagoitia, J.R., et al., "Relocating Direct Linking Loader for MCS–80 Microcomputer Series", Euromicro Newsletter (1977), vol. 3, No. 3, pp. 22–28.

Duncan, Ray, "Advanced OS/2 Programming", Microsoft Press (1989), Appendix D, pp. 715–736.

(List continued on next page.)

*Primary Examiner*—Daniel H. Pan
(74) *Attorney, Agent, or Firm*—Fliesler Dubb Meyer & Lovejoy LLP

(57) ABSTRACT

Relocation table entries in a executable object code file are interpreted as relocation instructions rather than as individual specifications for a particular respective relocatable information item. An abstract machine is provided for interpreting the relocation instructions and performing various relocation operations and various control functions for the abstract machine, in response to the relocation instructions. Certain variables contain information which is referenced and updated in response to certain types of the relocation instructions, thereby obviating the need to include such information as part of each relocation instruction. Certain of the relocation instruction types can also specify a particular relocation operation to be performed on a run of n consecutive relocatable information items, where n is specified as part of the relocation instruction. Certain of these relocation instruction types also consider each information item as including two or more individual relocations of the same or different types to perform, thus effectively specifying a run of n repetitions of a pattern of relocations. Other types of relocation instructions are also made available.

61 Claims, 6 Drawing Sheets

OTHER PUBLICATIONS

"The Concise Atari ST 68000 Programmer's Reference Guide", Glentop Publishers (Aug. 1986), pp. 2–20–2–27.

"SCO® UNIX® Development System, Programmer's Reference Manual Volume 1", SCO Open Systems Software (Dec. 10, 1991), pp. 180–186, 294–299, 337, 351–354, 369–372.

"R6000 InfoExplorer", Articles Published on CD–ROM: IBM Corporation, 1991. Articles entitled: "a.out File Format"; "Optional Auxiliary Header for the a.out File"; "Section Headers for the a.out File"; "Raw Data Sections for the a.out File"; "Special Data Sections for the a.out File"; "Relocation Information for the a.out File"; "xcoff.h"; "filehdr.h"; "reloc.h"; "scnhdr.h"; "loader.h".

* cited by examiner

| 15 | 13 12 | 9 8 | 0 | |
|---|---|---|---|---|
| 0 1 0 | SUBOP4 | CNT9 | | RUN |

FIG. 7A

| 15 | 12 11 | 0 | |
|---|---|---|---|
| 1 0 0 0 | | B12 | DELTA |

FIG. 7B

| 15 | 13 12 | 9 8 | 0 | |
|---|---|---|---|---|
| 0 1 1 | SUBOP4 | IDX9 | | GLP |

FIG. 7C

| 15 14 13 | 6 5 | 0 | |
|---|---|---|---|
| 0 0 | W8 | N6 | DELTADATA |

FIG. 7D

| 15 | 12 11 | 8 7 | 0 | |
|---|---|---|---|---|
| 1 0 0 1 | I4 | CNT8 | | RPT |

FIG. 7E

| 28 27 26 | 25 | 0 | |
|---|---|---|---|
| 0 1 0 | SUB-OPC | OFFSET26 | |

FIG. 7F

| 28 27 26 | 25 | 22 21 | 0 |
|---|---|---|---|
| 0 1 1 | SUB-OPC | CNT4 | CNT22 |

FIG. 7G

RELOCATABLE OBJECT CODE FORMAT AND METHOD FOR LOADING SAME INTO A COMPUTER SYSTEM

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

1. Field of the Invention

The invention relates to the loading of software into memory for execution by a computer system, and more particularly, to techniques for updating relocatable address pointers in such software to reflect the actual memory addresses at which the designated symbols are loaded.

2. Description of Related Art

Computer programs are typically written originally in source code in a computer language such as C or Pascal, or in an assembly language. To prepare the program for execution on a computer system, one or more source code modules are passed through a compiler (or assembler) which is specific to the language used and the computer system on which it will be executed, and which generates an object code file as its output. A linker routine, which is either a separate program or is part of the compiler, combines them into a single output file, known as an "executable" object code file. One or more executables are then loaded together into memory by a loader program, and control is transferred to a start address to initiate program execution.

An executable object code file typically includes, among other things, a header section which contains information about the structure of the file; one or more code sections which contains binary instructions which are directly executable by the system's CPU; one or more data sections; and a loader section, the contents of which are described below.

A data section typically contains data which was initialized by the compiler in response to the source code, descriptors describing various procedure pointers, as well as several other types of pointers. The various pointers which are contained in the data section may include some which refer to the address in memory of other data objects or of specific computer instructions. For example, a pointer may refer to specific objects in a code section, such as the entry point of a procedure. Other pointers in the data section may contain the addresses of other objects in the same data section. (As used herein, an address may be real or virtual, depending on the computer system used). Further, in systems where programs may be compiled into two or more executable files and subsequently loaded together, a data section in one file may contain pointers to objects in a code or data section of another file.

All of these references to absolute addresses must be "relocatable" since at the time of compilation and linking, the compiler/linker has no way of knowing what will be the ultimate addresses in memory at which the various referenced objects will be loaded. Thus references in an executable object code file to an address in a code section are often represented in a form which is merely relative to the start of the code section, and references to an object in a data section are represented in a form which is merely relative to the starting address of the data section. The loader program is then able to perform a relocation of these references by, after a referenced section is loaded into memory and the start address of that section is known, merely adding that start address to all of the references to objects within that section.

References to external symbols are typically represented in an executable object code file as indices into a symbol import table which is also contained in the file, each entry in the import table identifying both the name of one of the symbols and the external file which should contain that symbol. The indices are often numbered consecutively. When the loader program encounters a reference to an external symbol, it loads the external file and determines the address of the referenced symbol. The loader program then relocates the reference by adding in the address of the referenced symbol.

The loader section of an executable object code file typically includes a relocation table containing entries which specify how each relocatable reference is to be relocated upon loading into memory. For example, for a relocatable reference to an object which is within a code section, the relocation table contains a specification that the number to be added to the reference is the start address of the code section, rather than the start address of some other section. Similarly, for a relocatable reference to an object which is contained within a data section, the relocation table contains an entry specifying that the number to be added to the relocatable reference is the start address of the data section rather than of a code section. For a relocatable reference to an external symbol, the relocation table contains a corresponding specification of the index to the desired entry in the symbol import table.

When the loader program begins operation, it retrieves the desired executable object code file from a mass storage device such as a disk. If the computer system permits multiple tasks to be resident simultaneously using a shared object code section, then a separate copy of the data section(s) is (are) made for each task which will use the loaded file. In one example of memory organization, the loader may first check whether the desired file is already present in memory for another task. If not, the loader loads the header, code, data and loader sections of the file into a portion of memory which is read-only to individual users. In either case, the loader then makes a copy of the data section(s) in read/write memory for the new task.

If the loader has been invoked to load several files or modules into memory at the same time, then these files, too, are loaded into memory in the same manner as the first file. All the references to external symbols are resolved at this time, by inserting into each file's symbol import table the address into which each symbol has been loaded. Symbol imports may be resolved recursively. That is, when one module (e.g. an application program) references a symbol in a second module (e.g. a library), the loader may load and perform all relocations on the second module before returning to resolve the symbol in the first module. Similarly, if the second module references a symbol in a third module, the loader may load and perform all relocations in the third module before returning to the second, and so on.

After the various sections of file have been loaded into memory, and imports have been resolved, the loader performs the relocation process. The relocation process is performed by traversing the relocation table in the loader section, and performing the specified relocation operation for each of the relocatable references contained within the current file.

One popular format for executable object code files is known as XCOFF. XCOFF is described in the following articles published in IBM, "R6000 InfoExplorer" (CD-ROM, 1992):

"a.out File Format",
"Optional Auxiliary Header for the a.out File",
"Section Headers for the a.out File",
"Raw Data Sections for the a.out File",
"Special Data Sections for the a.out File",
"Relocation Information for the a.out File",
"xcoff.h",
"filehdr.h",
"reloc.h",
"scnhdr.h",
"loader.h";

all incorporated herein by reference. In XCOFF, each entry in the relocation table is 12 bytes long and contains the following fields:

TABLE I

| Field Name | Length (Bytes) | Description |
| --- | --- | --- |
| l_vaddr | 4 | Offset within section number specified in l_rsecnm, of an information item to be relocated. |
| l_symndx | 4 | External symbol import table index of object that is being referenced. |
| l_rtype | 2 | Type of relocation. |
| l_rsecnm | 2 | Number of the section containing the relocatable item governed by this table entry. |

The l_symndx field of a relocation table entry specifies whether the item to be relocated is a reference to an external symbol, or to an object in one of the code or data sections. Specifically, values of 1 and 2 indicate that the reference is to an object in a .data or .bss section respectively (both of which are considered "data sections" as the term is used herein), and a value of 0 indicates that the reference is to an object in a .text section (code). Values of 3 or higher constitute indices into the external symbol import table for the file, and indicate that the relocatable reference in the information item is a reference to the corresponding external symbol. In this case, the relocatable reference in the information item itself may contain 0, or an offset value to which the address of the external symbol will be added. Note that while relocation table entries have the capacity to control relocations of information items contained in the code section, this capacity is rarely used on computer systems which support relative branching. For these systems, when a compiler generates a branch instruction for the code section, it typically uses the relative branch format so as to obviate any need for a relocation. When the compiler generates an instruction which references a data object, it typically uses an indexed addressing mechanism for which only the offset from the base address of the data section need be included in the ultimately executed code. The software pre-loads the starting address of the desired data section into a register to use as the base address.

Further, in the situation where code sections are sharable, relocations are avoided in the code section also because the relocation appropriate for one task may not be the same as the relocation appropriate for another task sharing the same code section.

The l_rtype field indicates the type of relocation which is to be performed, and most commonly contains a value indicating that the reference is an absolute 32-bit reference to the virtual address of the object.

l_rsecnm indicates the section number containing the information item to be relocated. As with the l_symndx field, certain predefined values are implicit references to the .text, .data and .bss sections, respectively.

The XCOFF file format is extremely inefficient in terms of space occupied in the mass storage device, in terms of memory usage at launch time, and in terms of the time required to launch an application. The space which an XCOFF file occupies in mass storage is in large part due to the fact that XCOFF requires 12 bytes of relocation information for each 4-byte word in the data section that requires relocation. Thus in an executable object code file containing 1.5 megabytes, as much as 300 k bytes might be occupied by the relocation table. The relocation table space overhead is also a large factor in the inefficient usage of memory at launch time. The inefficiency of launch time speed performance is due in part to the need to retrieve and interpret 12 bytes for every relocation to be performed.

Another conventional format for executable object code files is used in the GEM disk operating system for Atari ST computers. See K. Peel, "The Concise Atari ST 68000 Programmer's Reference Guide" (Glentop Publishers: 1986), especially pp. 2–21 through 2–24. The entire Peel guide is incorporated herein by reference.

In the GEM format, the loader section of an executable object code file consists of a series of bytes, each of which specifies at most a single relocation. A loader routine maintains a pointer into the program being loaded, and updates the pointer in dependence upon each byte in the loader section. Specifically, if a byte in the loader section contains any number between 2–255 inclusive, the loader routine advances the pointer by the specified number of bytes and adds the start program address to the 32-bit relocatable reference then pointed to by the pointer. If the byte in the loader section contains the value 1, then the loader routine advances the pointer by 254 bytes without performing a relocation. A zero byte in the loader section indicates the end of relocations.

The GEM executable object code file format and loader routine are extremely primitive, lacking any capability for symbol imports and exports, for separate code and data sections, or for any kind of relocation other than the addition of the start program address to a 32-bit relocatable reference. Additionally, like the XCOFF format, the GEM format still contains a relocation table entry (byte) for each relocation to be performed.

SUMMARY OF THE INVENTION

The invention takes advantage of certain characteristics of executable object code files to drastically reduce the number of bytes of relocation information which are required per relocation. In particular, roughly described, relocation table entries in an executable object code file are interpreted as relocation instructions rather than individual specifications for a particular respective relocatable information item. An abstract machine is provided for interpreting the relocation instructions and performing various relocation operations and various control functions for the abstract machine, in response to the relocation instructions. The abstract machine maintains certain variables containing information which is referenced and updated in response to certain types of the relocation instructions, thereby obviating the need to include such information as part of each relocation instruction.

Certain of the relocation instruction types can also specify a particular relocation operation to be performed on a run of n consecutive relocatable information items, where n is specified as part of the relocation instruction. Other types of relocation instructions are also made available.

BRIEF DESCRIPTION OF THE DRAWINGS

The invention will be described with respect to particular embodiments thereof, and references will be made to the drawings, in which like elements are given like designations, and in which:

FIGS. 7A–7G illustrate field definitions for relocation instructions recognized by the abstract machine.

DETAILED DESCRIPTION

Figure 1:
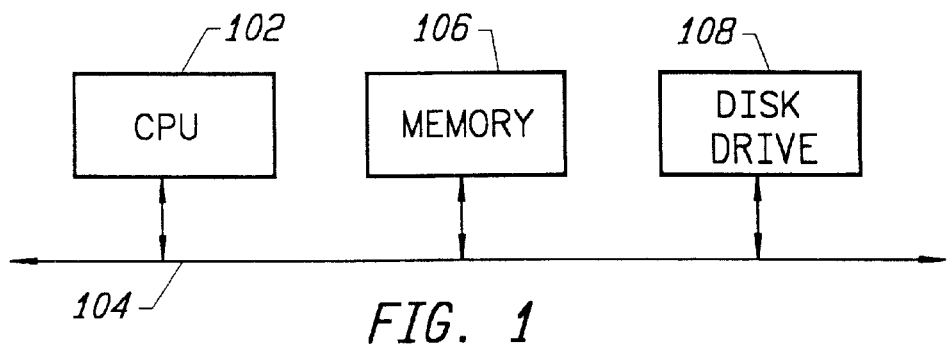
FIG. 1 is a symbolic, simplified block diagram of a computer system which may incorporate the invention.

FIG. 1 is a symbolic block diagram of a computer system which may be used to implement the invention. It comprises a CPU 102 which is coupled to a bus 104. The bus 104 is also coupled to a memory 106 and a disk drive 108. Numerous types of computer systems may be used, but in the present embodiment, computer software is usually stored on the disk drive 108 and brought into memory 106 over the bus 104 in response to commands issued over bus 104 by the CPU 102. The CPU 102 runs an operating system which, possibly together with specialized hardware, supports virtual addressing. That is, a computer program running on CPU 102 can reference memory addresses in an address space which is much larger than the physical space in memory 106, with the operating system and/or specialized hardware swapping pages from memory 106 to and from the disk drive 108 as necessary. The operating system also supports multitasking, in which two or more tasks can execute different copies of the same or different software in a parallel or time-sliced manner.

Executable object code files stored on the disk drive 108 are referred to herein as containers, and those that incorporate features of the presently described embodiment are referred to as PEF containers (that is, they follow a "PEF" format). Such files may also be retrieved from a different part of memory 106, or from another resource (not shown). A PEF container may contain the compiler output from a single source code module or, if the compiler is able to combine more than one source code module, the output from a plurality of source code modules. Several different containers (PEF or otherwise) may be required to form a complete program.

OVERALL PEF CONTAINER STRUCTURE

Each PEF container contains the following portions: a container header, N section headers, a string table, and N section data portions. The container header is of a fixed size and contains global information about the structure of the PEF container. The exact contents of the container header are unimportant for an understanding of the present invention and are therefore not described herein.

The section headers portion of a PEF container includes a section header for each of N "sections". Every PEF section, regardless of whether it includes any raw data, has a corresponding section header. Such sections include, for example, loadable sections such as code and data sections, and nonloadable sections such as a "loader" section. Each of the sections has a corresponding section number which is derived from the order of the section headers in the section header portion of the PEF container, starting with section 0. Section 0 is typically a code section and section 1 is typically a data section, but this is not a requirement.

Each section header is 28 bytes long and has the following structure:

TABLE II

| No. of Bytes | Description |
| --- | --- |
| 4 | Section name (offset into global string table). |
| 4 | Desired section address in memory (typically 0) |
| 4 | Execution size in bytes. |
| 4 | Initialization size in bytes (prior to any zero-initialized extension). |
| 4 | Raw size in bytes. |
| 4 | Offset from beginning of container to this section's raw data. |
| 1 | Region kind (code section, data section, loader section, etc.). |
| 1 | Memory alignment required for this section (byte alignment, half-word alignment, full-word alignment, etc.). |
| 1 | Sharing kind (unsharable section, sharable within a context; sharable across all context within a task; sharable across all contexts within a team; or sharable across all contexts. |
| 1 | Reserved. |

The exact meaning of each of the elements in a section header is unnecessary for an understanding of the present invention, except as included in the table above, and except to note that the section kinds include the following sections:

TABLE III

| Kind | Description |
| --- | --- |
| code | A code section is loadable and contains read-only executable object code in binary format, in an uncompressed, directly executable format. |
| data | A data section is loadable and contains initialized read/write data followed by read/write zero-initialized data. The presence of zero-initialized read/write data is indicated by the section size being larger than the image size. A PEF data section combines the .data and .bss sections of a standard UNIX executable object code file. Data/sections are not compressed. |
| pidata | A Pattern Initialized data ("pidata") section is loadable and identifies a read/write data region initialized by a pattern specification contained in the section's raw data in the object file. In other words, the raw data portion of a PEF container which corresponds to a pidata header contains a small program that is interpreted by the loader to determine how the section of memory should be |

TABLE III-continued

| Kind | Description |
| --- | --- |
| | initialized. Zero extension is automatically handled by the loader for pattern- initialized data, as with the data section. |
| constant | A constant section is loadable and contains read-only data. The loader can place it in read-only memory, and a constant section is not compressed. |
| loader | The loader section is nonloadable and contains information about imports, exports and entry points. The format of the loader section is discussed below. |
| debug | The debug section is nonloadable and contains all information necessary for symbolic debugging of the container. Multiple formats can be supported, including the format of a conventional XCOFF .debug section. |

The PEF container format includes no region kind specifically for zero-initialized data, similar to a .bss section in a conventional XCOFF file. Rather, zero-initialized sections are achieved in PEF simply by specifying a data section with an init size of 0. The loader uses the exec size to determine how much space to allocate to the section in memory, and then uses the difference between the exec size and the init size to determine how much space to zero-initialize. Thus the effect of a data section with a 0 init size is to zero-initialize the entire data section in memory. Note there is no requirement that zero-initialized data sections immediately follow other data sections in memory.

The section data portion of the PEF container contains raw section data corresponding to each of the headers in the section header portion of the PEF container (except for zero-initialized sections). The sequence of section data portions need not be the same as the sequence of their corresponding section headers. The raw data within certain sections including code, data and loader sections are required to be 8-byte (double-word) aligned. For code sections, the raw data simply contains the executable object code. For data sections, the raw data contains the initialized data for the section. For the loader section, the raw data contains additional information needed by the loader as set forth in more detail below.

Loader Section Format

The loader section contains the following portions:

Loader section header

Table of Import Container ID's

Import Symbol Table

Relocation headers

Relocation instructions

Loader String Table

Export Slot Table

Export Chain Table

Export Symbol Table.

Loader Section Header. The loader section header has a fixed size, and provides information about the structure and relative location of the various components of the loader section. Most of the entries in the loader section header are unimportant for an understanding of the present invention, except to note that it contains, among other things, one entry specifying the number of entries present in the Table of Import Container ID's, one entry indicating the number of entries in the "import symbol table" portion of the loader section, one entry indicating the number of sections in the PEF container which require relocations, one entry indicating the byte offset from the start of the loader section to the start of the relocation instructions (Relocation Table), as well as entries used to navigate the symbol export portions of the loader section. All tables use zero-based indices.

Table of Import Container ID's. The Table of Import Container ID's contains an entry for each external container which may contain a symbol to be imported into the present PEF container. Such external containers may follow a conventional format such as XCOFF, or preferably follow the same format as described herein for a PEF container. Each entry in the Table of Import Container ID's contains, among other information which is not important for an understanding of the present invention, the following fields: an offset into the Loader String Table to indicate the name of the container, a count of a number of symbols which are contained in the Import Symbol Table for the particular external container, and a zero-based index of the first entry in the Import Symbol Table (in the present file) for the particular external container.

Import Symbol Table. The Import Symbol Table contains one entry for each external symbol to be imported. Each Import Symbol Table entry contains a symbol class identifier together with an offset into the Loader String Table to indicate the name of the symbol. All of the symbols to be imported from a given one of the external containers are grouped together in the Import Symbol Table, although within that group they may appear in any order. Imported symbols may be in any of the following classes: an address in code, an address in data, a pointer to a transition vector (also referred to herein as a descriptor or procedure pointer), a TOC symbol, or a linker inserted glue symbol.

Relocation Headers. The Relocation Headers portion of the loader section of a PEF container contains one entry for each loadable section of the PEF container which includes one or more information items to be relocated. As used herein, an "information item" may be a word, a double word, or any other unit of information which contains one or more relocatable address fields. Unlike the conventional file format, in which each relocatable information item consisted of exactly one relocatable address field, a relocatable information item in PEF may contain any number of relocatable address fields as defined by the relocation instruction.

Note that although relocations of information items which are contained within a code section are supported by the PEF container definition, code sections preferably do not include any load time relocations at all. This permits code sections to be located outside of user-writable memory, and also permits code sections to be sharable. Note also that though multiple data sections are supported, typically only one data section will exist.

Each header in the Relocation Headers portion of the loader section of a PEF container has the following format:

TABLE IV

| No. of Bytes | Description |
| --- | --- |
| 4 | Section number. |
| 4 | Number of bytes of relocation instructions for this section. |
| 4 | Offset from the start of the Relocation Table to the first relocation instruction for this section. |

The section number field of a relocation header identifies the section number of a loadable section whose information items are to be relocated. Section number 0 may, for example, be a code section, and section number 1 may, for example, be a data section. As set forth above, the section numbers are assigned depending on their sequence in the "Section Headers" portion of the PEF container. Also as set forth above, no relocation header will typically be included for a code section since code sections preferably contain no relocatable information items. Additionally, section numbers −1, −2 and −3 have special meanings which are not here relevant; these sections do not contain relocations.

Relocation Table. The Relocation Table in the loader section of a PEF container consists of an array of relocation instructions. All of the relocation instructions for information items within a given section of the PEF container are grouped together. The relocation instructions are two or four bytes in length and contain an opcode in the high-order bits. The remaining fields of the instruction depend upon the opcode and are described hereinafter.

Symbol Export Portions. The symbol export portions of the loader section of a PEF container include an Export Symbol Table and hashing information to find a desired entry in the Export Symbol Table for a supplied index or a supplied symbol name. The Export Symbol Table contains an entry for each symbol in the current PEF container which may be imported by another container. These entries include an offset into the Loader String Table of the current container to identify the name of the symbol, the number of the section in the current PEF container which contains the symbol, and the offset into that section at which the symbol may be found. The details of the symbol export portions of a PEF container are unimportant for an understanding of the present invention and therefore are not further described herein.

LOADER PROGRAM

Figure 2:
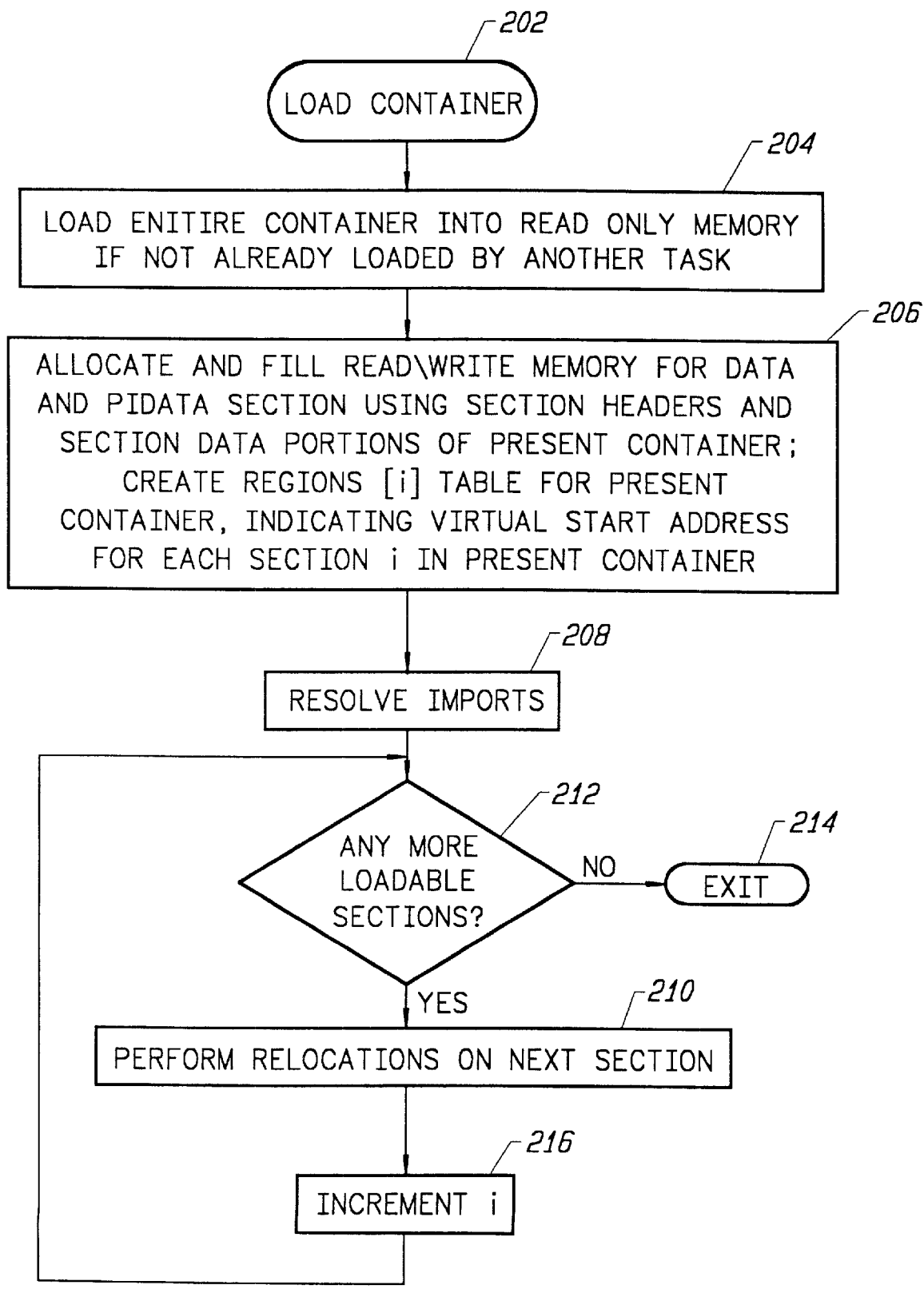
FIG. 2 is a simplified flow chart illustrating the broad functions of a loader program which may employ the present invention.

FIG. 2 is a simplified flow chart illustrating broad functions of a loader program which may employ the present invention. The LOAD CONTAINER routine 202 illustrated in the figure is recursive as hereinafter described.

In a step 204, the entire PEF container then being loaded is brought from the source of the container (disk drive 108, another portion of memory 106, or a resource (not shown)) into a portion of memory 106 which is not writable by a user program. If the desired container is already present in memory 106, having been previously loaded by another task, then this step 204 is skipped.

Figure 3:
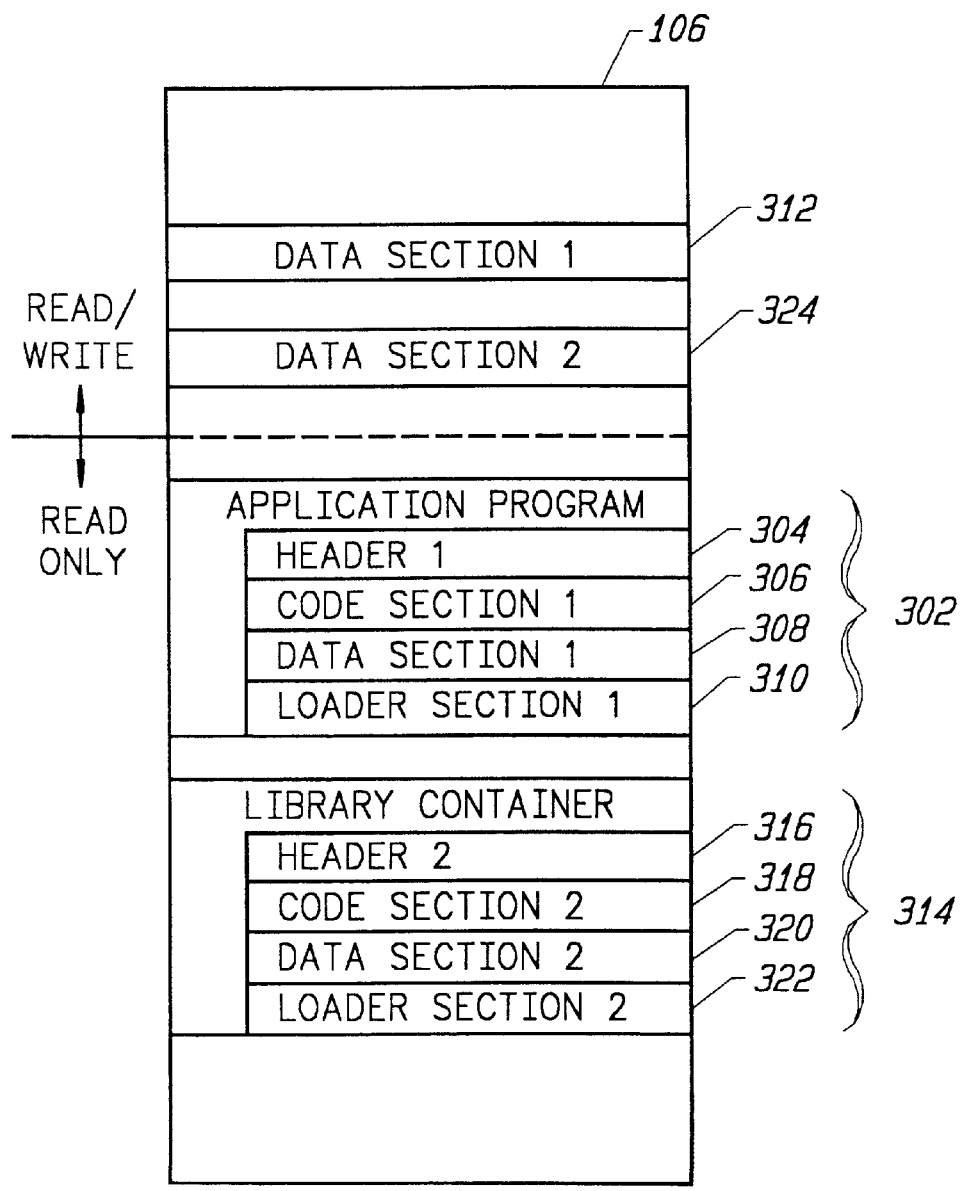
FIG. 3 is a symbolic diagram of information storage in the memory of FIG. 1.

FIG. 3 is a symbolic diagram of memory array 106 for an illustration of the LOAD CONTAINER routine for a situation in which the primary PEF container is an application program, and in which the application program includes calls to external symbols which are all located within a second PEF container referred to herein as a library container. As shown in FIG. 3, the application program is loaded in step 204 into a region 302 of the read-only portion of memory 106. The application program includes (among other sections not shown) a header section loaded into a memory region 304, a code section loaded into a memory region 306, a data section loaded into a memory region 308, and a loader section loaded into a memory region 310.

Referring again to FIG. 2, after the container is loaded into memory 106, the LOAD CONTAINER routine allocates and fills read/write memory regions for all the data and pidata sections (step 206). For the illustration of FIG. 3, this step involves copying the data section from region 308 of memory 106 into a region 312 in a read/write part of memory 106. The regions to be allocated in this step are identified in the header section 304 of the application program, and the data to be copied or otherwise written into the allocated memory regions derive from the corresponding section data portions of the application program.

Also in step 206, a regions[i] table is created to indicate the virtual start address for each region i created for the present container. Specifically, if the present container includes only one code section, and it is identified in the Section Headers portion of the container as a section 0, then regions[0] will carry the virtual address in read-only memory at which the code section was placed. In the example of FIG. 3, regions[0] will carry the virtual address of the start of memory region 306. Similarly, if section 1 of the container is a data section, then the table entry regions[1] will carry the virtual address of the data section in memory 106 as copied for use by the current task. In the example of FIG. 3, the table entry for regions[1] would carry the virtual address of memory 106 region 312. As mentioned, multiple code and data sections are supported and may occur in any order. Each is given a number, and the regions[i] table indicates where each section is located in memory 106.

Referring again to FIG. 2, after the regions[i] table is created, all references to external symbols are resolved in a step 208 and in a manner hereinafter described. (Note that in the present embodiment, though not important for an understanding of the present invention, certain external symbol imports need not be resolved at this time.) The result of the RESOLVE IMPORTS step 208 is an imports[j] table which carries the virtual address of each of the symbols j which are referenced in the present container. The RESOLVE IMPORTS step 208 is described in more detail below.

After the imports are resolved, a decision is made in a step 212 as to whether any relocation headers are present in the Relocation Headers portion of the loader section of the PEF container. If not, then the user program is now fully loaded into memory 106 and the LOAD CONTAINER routine 202 is complete. The user program may be executed at this time. If the Relocation Headers portion of the loader section does contain one or more relocation headers, then the loader executes a PERFORM RELOCATIONS step 210 on the section indicated by the next relocation header. As mentioned above, there is no requirement that the sequence in which sections are relocated be the same as the sequence of the sections in the PEF container, nor is there any requirement that sections be relocated in numerical order. After the relocations are performed on all the information items within the section identified in the current relocation header, the index into the relocation headers is incremented in a step 216, and the routine returns to the decision step 212 in order to determine whether any further Relocation Headers remain in the Relocation Headers portion of the loader section of the current PEF container. This process continues until all of such sections have been processed.

Symbol Import Resolution

Figure 4:
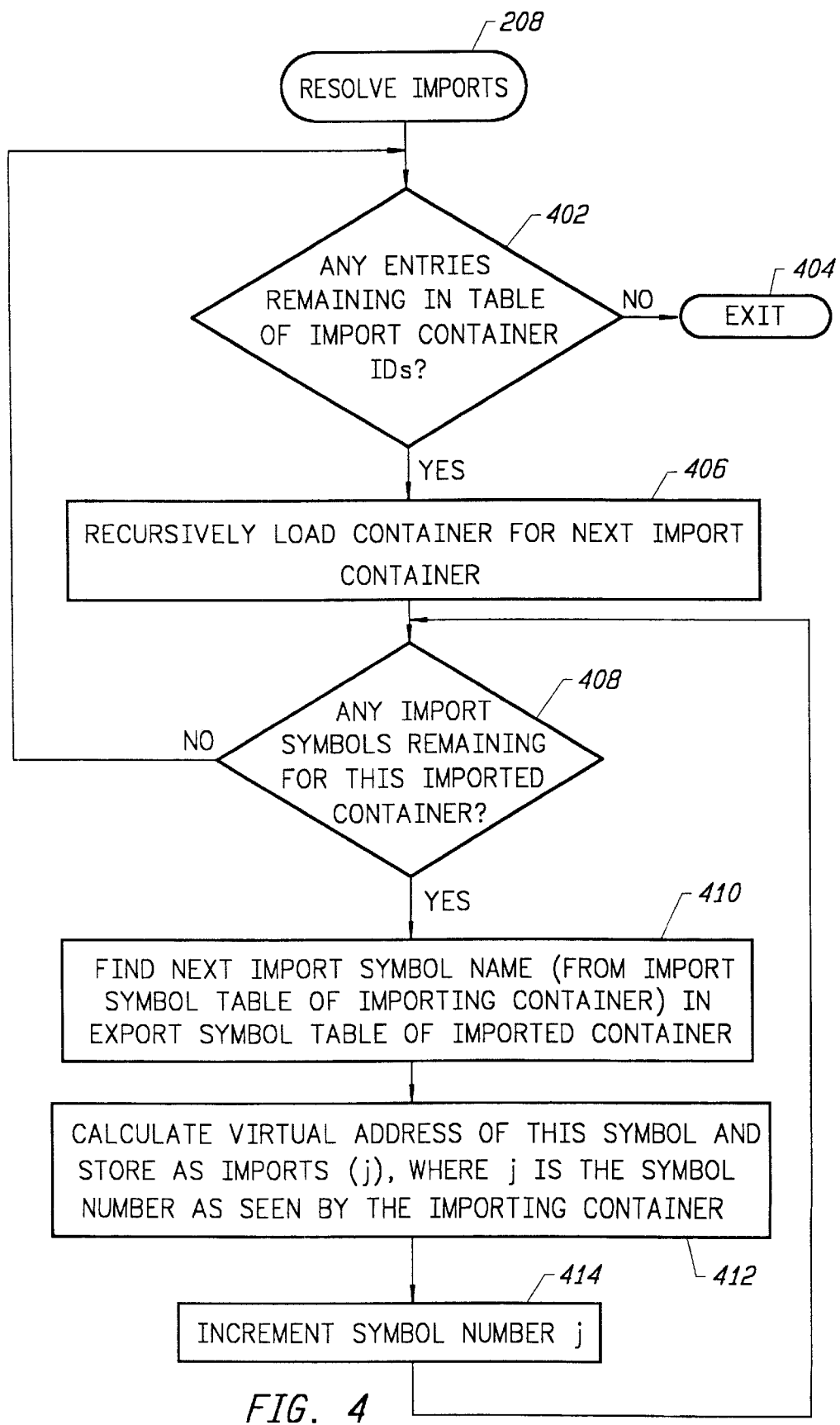
FIG. 4 is a flow chart detailing the RESOLVE IMPORTS step of FIG. 2.

FIG. 4 is a flow chart detailing the RESOLVE IMPORTS step 208 (FIG. 2). Generally described, the RESOLVE IMPORTS routine 208 loops through all of the Import Container ID's in the Table of Import Container ID's in the Loader section header of the current PEF container. For each such Import Container ID, the RESOLVE IMPORTS routine 208 recursively calls the LOAD CONTAINER routine to bring the referenced container into memory and to recursively resolve the imports specified therein. Once control returns to the RESOLVE IMPORTS routine for the present container (referred to herein as the "importing container"), the routine cycles through all of the entries in the Import Symbol Table in the loader section of the importing container. For each such entry, the routine compares the name of the imported symbol to various ones of the strings identified in the Export Symbol Table of the container most recently loaded (referred to herein as the "imported container") until a match is found. Such comparisons are facilitated by the hashed orgnaization of PEF export symbol tables. The virtual address of the imported symbol is then calculated from the corresponding entry of the Export Symbol Table of the imported container and stored in the imports[j] table.

Accordingly, the RESOLVE IMPORTS routine 208 begins with a step 402 in which it is determined whether any entries remain in the Table of Import Container ID's for the present container. If not, then the RESOLVE IMPORTS routine 208 is finished and the routine is exited in a step 404. If entries do remain in the Table of Import Container ID's, the LOAD CONTAINER routine is recursively invoked, in a step 406, for the next referenced container. As previously mentioned, containers need not all follow the PEF format, and if the next specified container is not in the PEF format, then another appropriate routine is invoked instead of LOAD CONTAINER.

After control is returned to the RESOLVE IMPORTS routine 208 for the present container, a determination is made whether the Loader Import Symbol Table in the loader section of the present container includes any further symbols to be imported from the container most recently loaded (step 408). If not, then control is returned to step 402 to determine whether the present container requires loading of any further external containers.

In the illustration of FIG. 3, recursive execution of the LOAD CONTAINER routine 202 results in the loading of the library container into a region 314 of the read-only part of memory 106. The container header of the library container is placed in a region 316, the code section is placed in a region 318, the data section is placed in a region 320, and the loader section for the library container is placed in a region 322. The data section 320 is also copied to region 324 in the read/write part of memory 106 for the present task. A separate regions[i] table is created for the library container and used as hereinafter described to perform relocations in the library container and, after processing resumes for the application program, to calculate the virtual addresses of symbols imported from the library container.

Returning to the flow chart of FIG. 4, after it is determined that additional symbols remain to be imported from the most recently loaded container, the RESOLVE IMPORTS routine 208 finds the next import symbol name (from the Import Symbol Table of the present container) in the Export Symbol Table of the container most recently loaded (step 410). Thus the completion of step 410 results in an index to the referenced entry in the Export Symbol Table of the most recently loaded container. In a step 412, the information in that Export Symbol Table entry is used to calculate the virtual address of the symbol to be imported, which is then stored in the imports[j] table for the importing container. In particular, the virtual address of the imported symbol is calculated as the virtual address of the section in the imported container which contains the imported symbol, plus the offset into that section where the symbol is located. The virtual address of the section in the imported container which contains the imported symbol is taken from the regions[i] table for the imported container, and both i and the offset are taken from the imported container's Export Symbol Table entry which has been identified for the symbol to be imported. The symbol number j is the symbol number as seen by the present, or importing container.

Note that if the section number in the Export Symbol Table entry for the desired symbol contains the special section number −2, then the virtual address is taken directly from the offset field of that entry. If the section number is −3 (indicating a re-export of a symbol imported into the library container from yet a third container), then the offset is used as an index into the library's import symbol table.

After the virtual address of the present symbol is calculated and stored in imports [j], j is incremented in a step 414 and control is returned to the decision step 408 to determine whether any further symbols need to be imported from the most recently loaded container.

Relocating References

Figure 5:
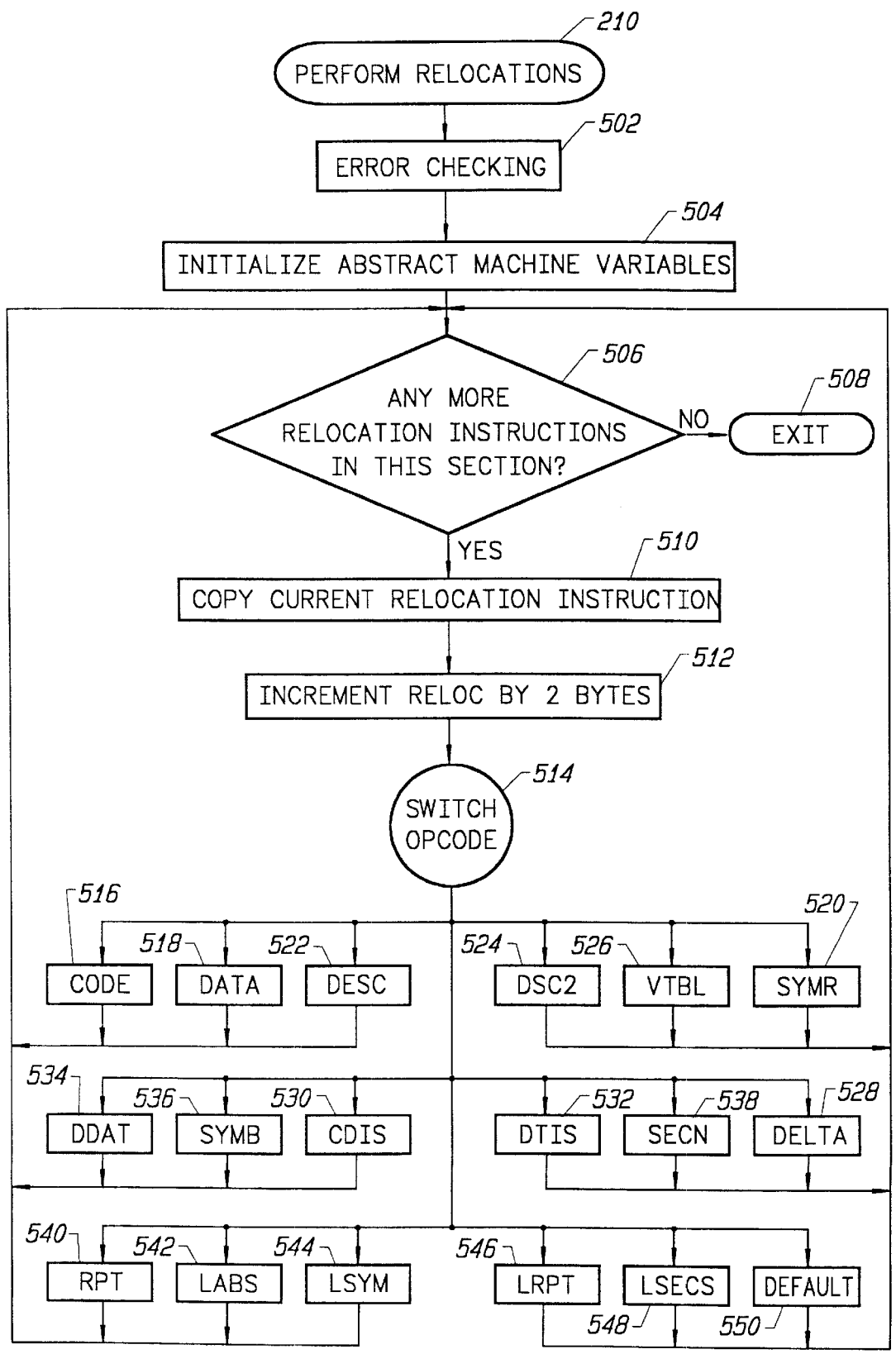
FIG. 5 is a flow chart detailing the PERFORM RELOCATIONS step of FIG. 2.

FIG. 5 is a flow chart detailing the PERFORM RELOCATIONS step 210 in FIG. 2. As mentioned, the PERFORM RELOCATIONS routine is invoked for each of the loadable sections i in the current PEF container, in the sequence specified in sequential relocation headers in the current PEF container. The current section number i is passed as a parameter to PERFORM RELOCATIONS routine. A C-language procedure which includes the PERFORM RELOCATIONS routine 210 is set out in the Appendix.

Referring to FIG. 5, the routine first checks for errors in a step 502, and aborts if an error is detected. Such errors can include the receipt of a section number which is less than zero or greater than the total number of sections in the current container. Another error might be that the section number provided by the calling routine is a constant section or the loader section, neither of which contain any relocatable items.

After the initial error checking step 502, several variables are initialized in a step 504. As will be seen, the individual elements of the Relocation Table are interpreted at a much higher level in the present embodiment than would relocation table entries in a conventional relocation table. This interpretation is performed in the present embodiment entirely in software, by routines which simulate decoding and execution of the relocation instructions in the Relocation Table. Thus the interpretation software forms a "pseudo machine" or "abstract machine" for interpreting and executing the relocation instructions.

Accordingly, the following abstract machine variables are initialized in the step 504:

reloc

Pointer to the next relocation instruction in the Relocation Table of the loader section of the current PEF container. Initialized to point to the first relocation instruction for the current section number as passed to the PERFORM RELOCATIONS routine 210.

rlEnd

Pointer to the first byte after the last relocation instruction for the current section number as passed to the PERFORM RELOCATIONS routine 210. Initialized to that value by adding, to reloc, the number of bytes of relocation instruction as specified in the relocation header for the current section.

rAddr

Pointer to the next information item in the raw data for the current section. Initialized to the memory address of the beginning of the memory region for the current section number.

rSymI

A symbol index (count value) which is used to access a corresponding import's address in the imports[i] table. Initialized to the value 0 for each new section.

codeA

Pointer to the starting memory address of one of the loadable sections in the current PEF container. Initialized to point to the starting memory address of section number 0 if section number 0 is present and loadable, otherwise it is initialized to the value 0. As will be seen, certain relocation instructions can change the value of codeA, thereby affecting subsequent relocations by relocation instructions that refer to this variable.

dataA

Pointer to the memory address of another one of the loadable sections in the current PEF container. Initialized to point to the starting memory address of section number 1 if section number 1 is present and loadable, otherwise initialized to the value 0. As with code A, certain relocation instructions can change the value of dataA, thereby affecting subsequent relocations by instructions that refer to this variable.

rpt

A counter variable used in the repeat instructions, described below. Initialized to the value 0.

The abstract machine variables codeA and dataA do not attempt to define which section is a code section and which section is a data section in the container, except to supply initial default values for these variables. The variables can point to any of the container's loadable sections, and can be changed as often as desired through the use of the relocation instructions.

Note that although codeA and dataA are described above as pointing to the memory address of a loaded section, they do so by storing a value equal to the memory address of the loaded section minus the default address for that section. The default address for a section is obtained from the desired Section Address field in that section's Section Header. The default address for the various sections are typically 0, however, so the value contained by the codeA and dataA variables will typically equal the starting address of the desired section in memory.

After the abstract machine variables are initialized, a decision is made as to whether there are any (further) relocation instructions corresponding to information items within the current section (step 506). This decision is made by testing whether reloc is less than rlEnd. If not, then the relocations are complete for the current section and PERFORM RELOCATIONS routine 210 is exited (step 508).

If more relocation instructions exist for the present section, then the next relocation instruction is retrieved and copied into a variable r (step 510). (Note that in another embodiment, the relocation instruction may be retrieved, for example as part of a step which tests its contents, without actually copying it into a variable for subsequent reference.) The variable reloc is then incremented by two bytes in a step 512. As will be seen, most of the relocation instructions are two bytes in length, although a few of them are four bytes in length. In step 510, only the first two bytes are copied into r. After step 510, reloc points to the next relocation instruction if the current one is only 2 bytes in length, or to the second half-word of the current relocation instruction if it is 4 bytes in length.

All of the instruction formats begin with an opcode in the high-order bits. Referring to FIG. 5, the opcode is used in a "switch" step 514 to pass control to one of a plurality of routines depending upon the contents of the opcode portion of the relocation instruction now in the variable r. In the present embodiment, all information items to be relocated are assumed to contain one or more relocatable references, each in the form of a 4-byte virtual address field, and relocation is accomplished by adding the contents of some specified pointer (a pointer to the start of a region in memory or a pointer taken from an import) to the relocatable reference.

After completion of the particular routine called for by the opcode in the retrieved relocation instruction, control returns to the decision step 506 in order to determine whether any further relocation instructions have been provided for the present section. If so, then the next relocation instruction is retrieved and the loop continues. If not, then the PERFORM RELOCATIONS routine 210 is exited.

RELOCATION INSTRUCTIONS

Relocation instructions in the present embodiment are objects that are packed as opcode and arguments. Some of the relocation instructions act as directives for the abstract machine itself, while others instruct that a relocation needs to be performed, and others instruct that many relocations of a particular type are to be performed. The various field definitions for the different types of instructions are fully set forth in the following C language typedef.

```
typedef union {
    struct { unsigned op:7, rest:9;                      } opcode;
    struct { unsigned op:2, delta_d4:8, cnt:6;           } deltadata;
    struct { unsigned op:7, cnt_m1:9;                    } run;
    struct { unsigned op:7, idx:9;                       } glp;
    struct { unsigned op:4, delta_m1:12;                 } delta;
    struct { unsigned op:4, icnt_m1:4, rcnt_m1:8;        } rpt;
    struct { unsigned op:6, idx_top:10;                  } large1;
    struct { unsigned op:6, cnt_m1:4, idx_top:6;         } large2;
    RelocInstr instr;
    TUnsigned16 bot;
} Relocation;
```

Figure 6:
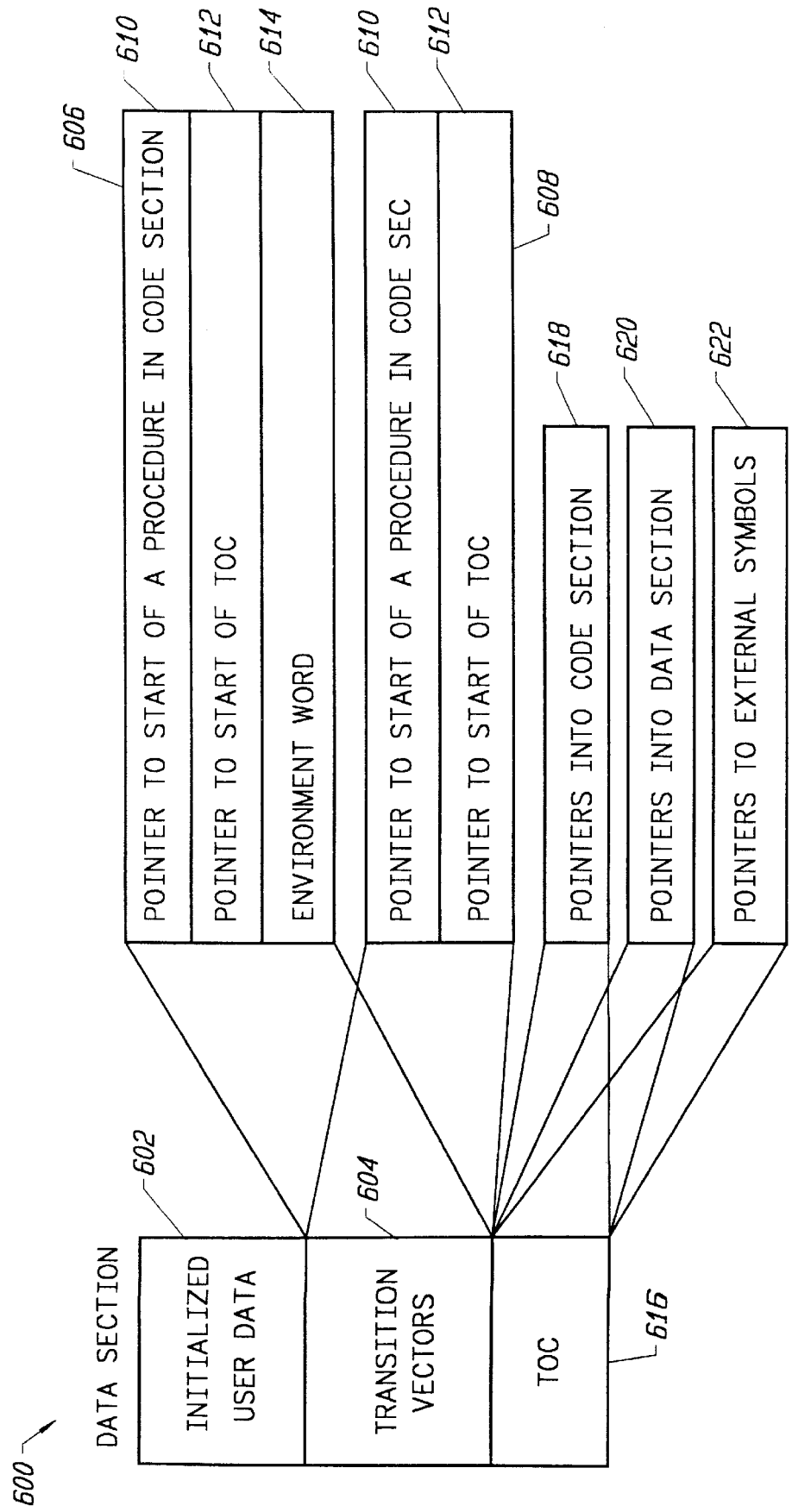
FIG. 6 illustrates the structure of a data section generated by a typical compiler.

Before proceeding, it will be useful to understand the structure of a data section 600 generated by a typical compiler. Such a structure is illustrated in FIG. 6. Grouped at the start of the data section 600 is initialized user data in a portion 602. Following the initialized user data portion 602, compilers typically place a group of contiguous transition vectors (also known as procedure descriptors) in a region 604. Transition vectors are used by external callers to procedures which are referenced by the transition vectors. Thus transition vectors are common especially in executable object code files produced on compilation of libraries. The compiler typically creates a transition vector for each procedure compiled, although by the time relocations are being performed by a loader program, the transition vectors for procedures which are never called by external callers typically have been eliminated.

Transition vectors are usually created in one of two formats, indicated in FIG. 6 as formats 606 and 608, respectively. A given compiler typically produces transition vectors in only one of the two formats 606 or 608. In format 606, each transition vector contains three 4-byte words. The first word is a pointer 610 to the start of a procedure in the code section, and the second word 612 is a pointer to a known location in the TOC for the data section 600. The third word 614 contains an "environment word" which is rarely used and is not important for an understanding of the present invention. As created by the compiler, the pointer 610 contains an offset into the code section for the desired procedure and pointer 612 contains an offset into the data section 600 usually for the start of the TOC. Thus the first word of each transition vector 606 must be relocated by the loader program through the addition of the start address of the code section in the current container. This is referred to as a "code-type relocation". Similarly, the second word of each transition vector 606 must be relocated by the loader program through the addition of the start address of a data section, typically the same data section 600 which contains the transition vector 606. This is known as a "data-type relocation". The environment word 614 in each of the transition vectors 606 does not need to be relocated.

Transition vectors of the second type 608 are the same as those of the first type 606, except that the third word of each transition vector is omitted.

Following the transition vectors 604, compilers typically place a table of pointers, also known as a table of contents (TOC) in a portion 616 of the data section 600. The TOC contains various pointers 618 into the code section, pointers 620 into the data section 600, and pointers 622 to external symbols which are to be imported. These pointers are typically intermixed, although it is frequent that several of one type are grouped together. As produced by a compiler, pointers into the code section carry only the offset into the code section and pointers into the data section carry only the offset into the data section. These types of pointers 618 and 620 therefore require code and data-type relocations, respectively. Pointers 622 to external symbols typically contain 0 upon completion of compilation, although they are permitted to contain an offset to which the address of the desired symbol will be added. The latter address is taken from an appropriate entry in the imports[i] table created by the RESOLVE IMPORTS routine 208 (FIG. 4). This type of relocation is referred to herein as a "symbol-type relocation".

Considering first the code-type relocations, it can be seen that the relocation table entries to accomplish such relocations in conventional executable object code formats require 12 bytes of relocation information for each 4-byte information item to be relocated. This is due in part to the fact that conventional format requires all of the following information to appear in each 12-byte relocation table entry: the section number containing the information item to be relocated, the offset within that section of the information item to be relocated, the section number whose starting address must be added to the information item, and an indication that the information item is a 32-bit word. In the present embodiment, on the other hand, most of this information either is maintained in one of the abstract machine variables, or is inherent in the relocation instruction opcode. In particular, the offset in the current section of the information item to be relocated, is maintained in the abstract machine variable rAddr together with the section number containing the information item to be relocated. Similarly, the number of different relocatable address fields in the information item to be relocated, and the fact that each is to be treated as a 32-bit pointer are inherent in the relocation instruction opcode, since a separate routine can be provided to perform the relocations specified by each relocation instruction opcode. Additionally, the section number whose starting address in memory is to be added to the offset value in the relocatable address field is also specified inherently by many of the relocation instruction opcodes.

Moreover, whereas the conventional executable object code file format requires one relocation table entry for each address field to be relocated, the loader program of the present embodiment takes advantage of the fact that as mentioned above, several relocations of the same type are often grouped together (as in the TOC). That is, a compiler may generate five pointers 618 into the code section sequentially, followed by four pointers 620 into the data section, followed by seven pointers 622 to external symbols, followed by more pointers 620 into the data section, and so on. The loader program of the present embodiment takes advantage of this characteristic by providing a class of relocation instructions which specify a type of relocation (e.g. code, data, symbol) together with a count of the number of such relocations to perform sequentially (i.e. in a "run").

Many of the relocation instructions which accommodate a run of similar type relocations follow the "run" instruction format illustrated in FIG. 7A. In this format, the high-order three bits carry an opcode of 010, the next four bits carry a subopcode indicating the type of relocation to perform, and the low-order nine bits carry a count CNT9 indicating the number of consecutive information items to be relocated in the manner specified by the subopcode.

One such relocation instruction type is CODE which, in a step 516 (FIG. 5) adds the value in abstract machine variable codeA to the information item specified by the machine variable rAddr for CNT9 consecutive information items. rAddr is incremented by four after each individual one of the relocations so as to point to the next information item in the run. Another such relocation instruction type is DATA which, in a step 518 adds the value in abstract machine variable data to the information item specified by the abstract machine variable rAddr for CNT9 consecutive four-byte information items.

Another relocation instruction type, SYMR, performs a run of symbol-type relocations. For each of the symbol-type relocations in the run, the information item specified by rAddr is relocated by adding the value from imports[rSymI], both rSymI and rAddr being incremented by 1 and 4, respectively, after each such relocation operation in the run. As mentioned, rSymI is initialized to zero at the start of processing a section. Unless specifically reset by an SYMB or LSYM instruction (described below), rSymI increases monotonically as the section is processed.

It can be seen that the availability of these three relocation-type instructions (CODE, DATA and SYMR) themselves can drastically reduce the number of bytes of Relocation Table information which are required to perform the required relocations on information items contained within a TOC. The DESC and DSC2 relocation instruction types can provide an even more drastic reduction. As previously mentioned, in a typical executable object code file, all of the transition vectors are grouped together in a portion 604 (FIG. 6). For transition vectors of type 606, each transition vector requires a code-type relocation, followed by a data-type relocation, followed by no relocation. For transition vectors of type 608, each transition vector requires a code-type relocation followed by a data-type relocation. In either case, the conventional executable object code format required 24 bytes (two 12-byte relocation table entries) to specify a transition vector relocation. In the present embodiment, on the other hand, a run-type relocation instruction, referred to herein as DESC, is provided for relocating a run of transition vectors of type 606. The routine is implemented in DESC step 522 (FIG. 5) in which, for each three-word information item 606 in the run, the value in abstract machine variable codeA is added to the word pointed to by rAddr and rAddr is post-incremented by four. The value in abstract machine variable dataA is then added to the word pointed to by rAddr, and rAddr is post-incremented again by four. rAddr is then incremented by four a third time to skip over the environment word 614. This procedure is repeated for each information item in the specified run.

The DSC2 relocation instruction type is similar to the DESC relocation instruction type, except that it is adapted for use on transition vectors of type 608. DSC2 instructions are processed in step 524 by a routine which is identical to the DESC routine 522 except for the omission of the third incrementing of rAddr.

Accordingly, it can be seen the relocation of an entire region 604 of transition vectors can be performed using a loader program of the present embodiment, in response to a single 2-byte relocation instruction. This represents a drastic savings over conventional loader programs.

Within the above framework, numerous types of relocation instruction can be developed to simplify relocations on other commonly occurring relocatable information item formats as they are recognized. For example, one relocatable information item format which is frequently produced in the initialized user data area 602 by C++ compilers is in the form of a one-word pointer to an object in the data section, followed by one word of nonrelocatable data. Thus in the present embodiment, a VTBL relocation instruction type is provided and processed in a step 526 which adds the value in the abstract machine variable dataA to the first word of each information item in a run, and leaves the second word of each information item in the run unchanged. Many other information item formats can be accommodated by other relocation instruction types.

Certain relocation instruction types modify the abstract machine variables without performing any actual relocation operation. For example, a DELTA-type relocation instruction merely adds a specified value to rAddr, thereby effectively skipping over a number of information items which are not to be relocated. The format of the DELTA instruction is illustrated in FIG. 7B, and in particular includes a 4-bit high-order opcode of 1000, followed by a 12-bit DELTA value B12. DELTA instructions are processed in a step 528 (FIG. 5), which merely adds B12+1 to the value in abstract machine variable rAddr.

The CDIS instruction also modifies the value of an abstract machine variable without performing any relocations. In particular, it loads the codeA variable with the starting memory address of a specified one of the loadable sections in the present PEF container. The CDIS instruction follows the format of FIG. 7C and contains a high-order 3-bit opcode of 011, followed by a 4-bit subopcode indicating the CDIS instruction, followed by a 9-bit IDX9 field for specifying the section number whose start address is to be loaded into codeA. The CDIS instruction is processed in step 530 (FIG. 5), which merely copies the pointer in regions [IDX9] into the abstract machine variable codeA.

A similar instruction which follows the same opcode format as CDIS is the instruction DTIS, processed in a step 532 (FIG. 5). The step 532 merely copies the value in regions[IDX9] into the abstract machine variable dataA. The CDIS and DTIS instructions are most useful when multiple code and/or data sections are produced by the compilation system.

Certain of the relocation instruction types supported in the present embodiment both perform a relocation operation and also further modify one of the abstract machine variables. For example, the DDAT instruction first increments rAddr by a specified number of words (similar to DELTA), and then performs a specified number of contiguous data-type relocations (similar to DATA). The DDAT instruction follows the format illustrated in FIG. 7D, which calls for a 2-bit high-order opcode of 00, followed by an 8-bit W8 field indicating the number of words of information items to skip, followed by an N6 field indicating the number of data-type relocations to subsequently perform. DDAT instructions are processed in a step 534 (FIG. 5), in a routine which first increments rAddr by four times the value in W8, and then adds the value in dataA to each of the N6 following information items. rAddr is incremented after each such relocation operation such that when the instruction is completed, rAddr points to the next information item after the run.

SYMB is another instruction which modifies an abstract machine variable and then performs a relocation operation. The SYMB instruction follows the format of FIG. 7C, and causes the abstract machine to first load rSymI with a new symbol number specified by IDX9, and then (similarly to the SYMR instruction for a run count of 1) add the value in imports [rSymI] to the relocatable information item then pointed to by rAddr. Both rSymI and rAddr are then incremented. The SYMB instruction is processed in a step 536 (FIG. 5).

The SECN instruction, which also follows the format of FIG. 7C, performs a single relocation to a section whose number is specified in IDX9. In step 538 (FIG. 5), the routine for processing SECN instructions merely adds the value in regions[IDX9] to the information item pointed to by rAddr, and increments rAddr.

The RPT instruction permits further compaction of the relocation table by providing a means of repeating a series of relocation instructions on a specified number of consecutive groups of information items. The RPT instruction follows the format of FIG. 7E, which includes a high-order 4-bit opcode of 1001, followed by a 4-bit number I4, followed by an 8-bit CNT8 field. When invoked, the abstract machine repeats the most recent I4 relocation instructions, CNT8 times. The RPT instruction is processed in a step 540 (FIG. 5) which first decrements the abstract machine variable rpt and tests for its value. If rpt is now less than 0, this is the first time that the RPT instruction was encountered and rpt is initialized to CNT8+1. Then, regardless of the value of rpt, the abstract machine variable reloc is decremented by the number of half-words specified by I4 and the routine is exited. This has the effect of causing the abstract machine to back up by I4 half-words of relocation instructions, and to repeat them. Note that since rAddr is not decremented, the repeated relocation instructions will operate on the next group of unrelocated information items (rather than on a repeated group of information items). If the initial decrementing of rpt brought that abstract machine variable to 0, then the RPT instruction is determined to be complete and the routine 540 is exited.

The number specified in I4 is a number of half-words rather than a number of relocation instructions. Thus if the repetition will include one or more 4-byte relocation instructions, then the value in I4 must include an additional count for each of such 4-byte relocation instructions. Also, the value in I4 is one less than the number of half-words to repeat (that is, I4=0 specifies a one half-word repeat, I4=1 specifies a two half-word repeat, etc.)

The LABS instruction is a 4-byte relocation instruction which follows the format of FIG. 7F. Specifically, the high-order 4 bits contain an opcode of 1010; the next two bits contain a subopcode of 00; and the low-order 26 bits carry a value OFFSET26. The LABS instruction is processed in a step 542, which adds the value OFFSET26 to the start address of the section whose information items are currently being relocated, and loads the result into abstract machine variable rAddr. Thus LABS performs a "jump" to a specific information item within the current section. Since the LABS instruction is a 4-byte instruction, the routine 542 concludes by incrementing reloc by another two bytes.

The LSYM instruction also follows the format of FIG. 7F, with a subopcode of 01. It performs the functions of setting a new symbol number in rSymI, and subsequently performing a symbol-type relocation on the information item then pointed to by rAddr. Both rSymI and rAddr are then post-incremented. The new symbol number is specified in the LSYM instruction in the field OFFSET26. The LSYM instruction is processed in step 544.

The LRPT instruction follows the format of FIG. 7G, in which the high-order four bits carry an opcode of 1011, the next two bits carry a subopcode of 00, the next four bits carry a CNT4 value and the last 22 bit s carry a CNT22 value. LRPT is similar to RPT, but allows for larger repeat counts. Specifically, when the LRPT step 546 is invoked, the last CNT4 2-byte relocation instructions are repeated the number of times specified in CNT22. Again, since LRPT is 4-byte instruction, step 546 concludes, after the last repetition, by incrementing reloc by another two bytes.

The instruction format of FIG. 7G is also used for three other 4-byte relocation instructions where the subopcode is 01 and CNT4 specifies which of the three instructions are to be invoked. The three instructions, all processed by LSECs step 548 (FIG. 5), are LSECN (which is the same as SECN but with a very large section number), LCDIS (which is the same as CDIS, but with a very large section number), and LDTIS (which is the same as DTIS, but with a very large section number). Again, since these instructions are 4-byte instructions, LSECs step 548 concludes by incrementing reloc by another two bytes.

If the opcode of the current relocation instruction pointed to by reloc is not recognized, then default step 550 indicates an error and breaks.

The invention has been described with respect to particular embodiments thereof, and it will be understood that numerous modifications are possible without departing from its scope. For example, the invention may be applied to relocatable object code file formats produced by a compiler prior to linking, although the invention is less useful in that context due to the relative scarcity of repeated patterns of relocations to be performed.

APPENDIX (37 C.F.R. §1.96(a) (2) (i))
Copyright 1993 Apple Computer, Inc.

```
OSErr PLPrepareRegion ( TPLPrivateInfoPtr ourPLInfo,
        TCount regIndex,
        TAddress regAddress )
{
  register TAddress *raddr;
  register TOffset dataA;
  register int cnt;
  register TOffset codeA;
  LoaderRelExpHeaderPtr ldRelHdrPtr;
  Relocation *reloc, *rlend;
  Relocation r;
  long rpt;
  long secn;
  long rsymi;
  TOffset *imports;
  TOffset *regions;
  long i;
  long relNum;
  TOffset regStart;
  int err = noErr;
#if NO_GLOBALS
#include "PEFtbl.h"
#endif
  if (ourPLInfo == NULL) return paramErr;
  if ((regIndex < 0) || (regIndex >= OurPLInfo->numRegions))
    return paramErr;
  if (ourPLInfo->sections[regIndex].regionKind == kLoaderSection)
    return paramErr;
  if (ourPLInfo->sections[regIndex].regionKind == kPIDataSection)
    return unimpErr;
  ourPLInfo -> resolved = 1;
  for (i = 0; ; i++) {
    if (i >= ourPLInfo -> numRegions) return noErr; /*no relocations for
      this data section*/
    ldRelHdrPtr = & ourPLInfo -> ldSections [i];
```

APPENDIX-continued (37 C.F.R. §1.96(a) (2) (i))
Copyright 1993 Apple Computer, Inc.

```
    if (ldRelHdrPtr -> sectionNumber == regIndex) break;
  }
  regions = ourPLInfo -> regionDeltas;
  imports = (TOffset *) ourPLInfo -> imports;
  regStart = (TOffset) regAddress;
  // subtract old default address from region address
  // region array will hold deltas from new address to old address
  // for (i = 0; i < ourPLInfo -> numRegions; i++)
  // regions [i] -= ourPLInfo -> sections [i]. sectionAddress;
  // the regions array already holds deltas - no need to change it
  reloc = (Relocation*) (ourPLInfo -> ldRelocations + ldRelHdrPtr ->
    relocationsOffset);
  rlend = (Relocation *) ((RelocInstr *) reloc + ldRelHdrPtr ->
    numRelocations);
  raddr = (TAddress *) regStart;
  rsymi = 0;
  codeA = regions [0];
  dataA = regions [1];
  rpt = 0;
  relNum = 0;
  while (reloc < rlend) {
    r = *reloc;
    reloc = (Relocation *) ((RelocInstr *) reloc + 1);
    switch ( opcode [r.opcode.op]) {
      case krDDAT:  raddr = (TAddress *)
                    ((TAddress) raddr + r.deltadata.delta_d4 * 4);
                    cnt = r.deltadata.cnt;
                    while (--cnt >= 0) {
// printf ("(0004:%061x) (#%4d) 1\n", (char *) raddr - regStart,
  relNum++);
                      *raddr++ += dataA;
                    }
                    continue;
      case krCODE : cnt = r.run.cnt_m1 + 1;
                    while (--cnt >= 0) {
// printf ("(0004:%061x) (#%4d) 0\n", (char *) raddr - regStart,
  relNum++);
                      *raddr++ += codeA;
                    }
                    continue;
      case krDATA : cnt = r.run.cnt_m1 + 1;
                    while (--cnt >= 0) {
// printf ("(0004:%061x) (#%4d) 1\n", (char *) raddr - regStart,
  relNum++);
                      *raddr++ += dataA;
                    }
                    continue;
      case krDESC : cnt = r.run.cnt_m1 + 1;
                    while (--cnt >= 0) {
// printf ("(0004:%061x) (#%4d) 0\n", (char *) raddr - regStart,
  relNum++);
                      *raddr++ += codeA;
// printf ("(0004:%061x) (#%4d) 1\n", (char *) raddr - regStart,
  relNum++);
                      *raddr++ += dataA;
                      raddr++;
                    }
                    continue;
      case krDSC2 : cnt = r.run.cnt_m1 + 1;
                    while (--cnt >= 0) {
// printf ("(0004:%061x) (#%4d) 0\n", (char *) raddr - regStart,
  relNum++);
                      *raddr++ += codeA;
// printf ("(0004:%061x) (#%4d) 1\n", (char *) raddr - regStart,
  relNum++);
                      *raddr++ += dataA;
                    }
                    continue;
      case krVTBL : cnt = r.run.cnt_m1 + 1;
                    while (--cnt >= 0) {
// printf ("(0004:%061x) (#%4d) 1\n", (char *) raddr - regStart,
  relNum++);
                      *raddr++ += dataA;
                      raddr++;
                    }
```

APPENDIX-continued (37 C.F.R. §1.96(a) (2) (i)
Copyright 1993 Apple Computer, Inc.

```
                  continue;
    case krSYMR :  cnt = r.run.cnt__m1 + 1;
                   while (--cnt >= 0) {
// printf ("(0004:%061x) (#%4d) %d\/n", (char *) raddr - regStart,
relNum++, rsymi);
                      *raddr++ += imports [rsymi++];
                   }
                   continue;
    case krSYMB :  rsymi = r.glp.idx;
// printf ("(0004:%061x) (#%4d) %d\n", (char *) raddr - regStart,
relNum++, rsymi);
                   *raddr++ += imports [rsymi++];
                   continue;
    case krCDIS :  codeA = regions [r.glp.idx];
                   continue;
    case krDTIS :  dataA = regions [r.glp.idx];
                   continue;
    case krSECN :  *raddr++ += regions [r.glp.idx];
                   continue;
    case krDELT :  raddr = (TAddress *)
                       ((TAddress) raddr + r.delta.delta__m1 + 1);
                   continue;
    case krRPT :   if (--rpt == 0) continue;    // count was 1 --> rpt
                                                   done
                   if (rpt < 0)      // first time rpt encountered?
                       rpt = r.rpt.rcnt__m1 + 1;   // yes- initialize rpt
                                                      count
                   cnt = r.rpt.icnt__m1 + 2;    // yes or no - back up
                                                   cnt instrs
                   reloc = (Relocation *) (RelocInstr *) reloc - cnt);
                   continue;
    case krLABS :  raddr = (TAddress *)
                       ((r.large1.idx__top << 16) + reloc -> bot +
                       regStart);
                   reloc = (Relocation *) (RelocInstr *) reloc + 1);
                   continue;
    case krLSYM :  rsymi = (r.large1.idx__top << 16) + reloc -> bot;
                   reloc = (Relocation *) (RelocInstr *) reloc + 1);
// printf ("0004:%061x) (#%4d) %d/n", (char *) raddr - regStart,
relNum++, rsymi);
                   *raddr++ += imports [rsymi++];
                   continue;
    case krLRPT :  if (--rpt == 0) {
                       reloc = (Relocation *) (RelocInstr *) reloc + 1);
                       continue;
                   }
                   if (rpt < 0)
                       rpt = (r.large2.idx__top << 16) + reloc -> bot;
                   cnt = r.large2.cnt__m1 + 2;
                   reloc = (Relocation *) (RelocInstr *) reloc - cnt);
                   continue;
    case krLSEC :  secn = (r.large2.idx__top << 16) + reloc -> bot;
                   switch (r.large2.cnt__m1) {
                       case 0 : *raddr++ += regions [secn]; break;
                       case 1 : code     = regions [secn]; break;
                       case 2 : dataA    = regions [secn]; break;
                   }
                   reloc = (Relocation *) (RelocInstr *) reloc + 1);
                   continue;
    default :      err = unimpErr;
                   break;
    }
}
// restore actual region addresses to the regions array
// instead of region deltas
// for (i = 0; i < ourPLInfo -> numRegions; i++)
//    regions [i] += ourPLInfo -> sections [i]. sectionAddress;
// the region array now always holds deltas - don't want to change it
   back
   return err;
} /* PLPrepareRegion () */
```

What is claimed is:

1. A method for loading a relocatable file into a computer system memory for execution, said file having a plurality of information items to be loaded into said memory, certain ones of said information items having a respective first address field containing a relocatable address, said file further having a plurality of loading instructions, comprising the steps of:
   retrieving one of said loading instructions; and
   updating the first address field of n consecutive ones of said information items in response to said one of said loading instructions, n being specified in said one of said loading instructions.

2. A method according to claim 1, further comprising the step of repeating said steps of retrieving and updating for different ones of said plurality of loading instructions.

3. A method according to claim 2, wherein said loading instructions are of different types, said step of updating comprising steps which depend upon the type of each respective one of said loading instructions.

4. A method according to claim 2, wherein each of said loading instructions is located at a respective address, wherein the address of said loading instruction is determined from a first pointer (reloc) for each repetition of said step of retrieving, further comprising, in conjunction with each repetition of said step of retrieving, the step of updating said first pointer (reloc) to a value dependent upon the length of said retrieved loading instruction.

5. A method according to claim 4, wherein said step of updating said first pointer (reloc) comprises the step of updating said first pointer (reloc) to point to the one of said loading instructions which immediately follows said retrieved loading instruction.

6. A method according to claim 4, wherein said step of updating said first pointer (reloc) comprises the step of adding to said first pointer (reloc) the number of bytes in said retrieved loading instruction.

7. A method according to claim 2, wherein the address in said memory of the first of said n consecutive information items is determined from a second pointer (rAddr) for each repetition of said step of updating, further comprising, in conjunction with each repetition of said step of updating, the step of updating said second pointer (rAddr) to a value dependent upon n.

8. A method according to claim 7, wherein said step of updating said second pointer (rAddr) comprises the step of updating said second pointer (rAddr) to point to the first address in said memory which follows said n consecutive information items.

9. A method according to claim 7, wherein said step of updating said second pointer (rAddr) comprises the step of adding to said second pointer (rAddr), n times a predetermined number of bytes per information item.

10. A method according to claim 1, wherein said step of updating the first address field comprises the step of updating the first address field of each given information item in said n consecutive information items to a value which depends upon a respective given element of a table (imports).

11. A method according to claim 10, wherein said step of updating the first address field of each given information item comprises the steps of:
   updating the first address field of an i'th one of said n consecutive information items to a value which depends upon an i'th element of said table, i being determined from a count value (rSymI);
   incrementing said count value (rSymI) in conjunction with each repetition of said step of updating the first address field of an i'th one of said n consecutive information items; and
   repeating, for each of said n consecutive information items, said step of updating the first address field of an i'th one of said n consecutive information items and said step of incrementing said count value (rSymI).

12. A method according to claim 11, wherein said step of updating the first address field of an i'th one of said n consecutive information items comprises the step of adding the contents of said i'th element of said table to said first address field of said i'th one of said n consecutive information items.

13. A method according to claim 1, wherein said step of updating the first address field comprises the step of updating the first address field of each given information item in said n consecutive information items to a value which depends upon a third pointer (codeA, dataA), the value in said third pointer (codeA, dataA) remaining unchanged for said entire step of updating the first address field of n consecutive ones of said information items.

14. A method according to claim 13, wherein said step of updating the first address fields of each given information item comprises the step of adding the contents of said third pointer (codeA, dataA) to said first address field of said given information item.

15. A method according to claim 13, further comprising the step of selecting said third pointer (codeA, dataA) in dependence upon said loading instruction (e.g. CODE, DATA).

16. A method for loading a relocatable file into a computer system memory for execution, said file having a plurality of information items to be loaded into said memory, certain ones of said information items having a respective first address field containing a relocatable address, said file further having a plurality of loading instructions, comprising the steps of:

retrieving one of said loading instructions from a location dependent upon a first pointer (reloc);

updating said first pointer (reloc) in conjunction with each repetition of said step of retrieving;

performing, if said retrieved loading instruction is in a first class of loading instructions (e.g. DDAT, CODE, DATA, DESC, DSC2, VTBL, SYMR, SYMB, SECN, LSECN), a loading operation on at least one of said information items, said at least one of said information items being designated by a second pointer (rAddr), said loading operation including steps which are designated by said retrieved loading instruction;

updating said second pointer (rAddr) in conjunction with each performance of one of said loading operations on said at least one of said information items, and repeating said steps of retrieving, updating said first pointer (reloc), performing, and updating said second pointer (rAddr).

17. A method according to claim 16, wherein said retrieved loading instruction is in a second class of loading instructions (e.g. DDAT, CODE, DATA, DESC, DSC2, VTBL, SYMR) which is within said first class, and wherein said steps of said loading operation comprise the step of updating the first address field of n consecutive ones of said information items, the beginning of said n consecutive ones of said information items being designated by said second pointer (rAddr), n being specified in said retrieved loading instruction.

18. A method according to claim 17, wherein said retrieved loading instruction is in a third class of loading instructions (e.g. DDAT, CODE, DATA, DESC, DSC2, VTBL) which is within said second class, and wherein said step of updating the first address field comprises the step of updating the first address field of each given information item in said n consecutive ones of said information items to a value which depends upon the prior contents of such first address field and upon a third pointer (codeA, dataA), the value in said third pointer (codeA, dataA) remaining unchanged for said entire step of updating the first address field of n consecutive information items.

19. A method according to claim 17, wherein said retrieved loading instruction is in a fourth class of instructions (e.g. DDAT) within said third class, and wherein said step of updating the first address field comprises the step of adding the contents of a third pointer (dataA) to said first address field of each of said n consecutive information items, further comprising the step, if said retrieved loading instruction is in said fourth class of instructions (e.g. DDAT), incrementing said second pointer (rAddr) by a value specified in said retrieved loading instruction prior to said step of performing a loading operation.

20. A method according to claim 17, wherein said retrieved loading instruction is in a fifth class of loading instructions (e.g. CODE, DATA) within said second class, said fifth class including a sixth class of loading instructions (e.g. CODE) and a seventh class of loading instructions (e.g. DATA), and wherein said step of updating the first address field comprises the steps of:

adding the contents of a third pointer (codeA) to said first address field of each of said n consecutive information items if said retrieved loading instruction is in said sixth class of instructions (e.g. CODE); and adding the contents of a fourth pointer (dataA) to said first address field of each of said n consecutive information items if said retrieved loading instruction is in said seventh class of instructions (e.g. DATA).

21. A method according to claim 17, wherein said retrieved loading instruction is in an eighth class of instructions (e.g. VTBL) within said second class, wherein said step of updating the first address field comprises the step of adding the contents of a fourth pointer (dataA) to the first word of each of said n consecutive information items, each of said n consecutive information items having a length of two words, and wherein said step of updating said second pointer (rAddr) comprises the step of incrementing said second pointer by 2n words.

22. A method according to claim 17, wherein said retrieved loading instruction is in a ninth class of loading instructions (e.g. DESC, DSC2) within said second class, wherein said step of updating the first address field comprises the step of adding the contents of a third pointer (codeA) to said first address field of each of said n consecutive information items, wherein each of said n consecutive information items further has a second address field, said steps of said loading operation further comprising the step of adding the contents of a fourth pointer (dataA) to said second address field of each of said n consecutive information items.

23. A method according to claim 17, wherein said retrieved loading instruction is in a tenth class of instructions (e.g. SYMR) and wherein said step of updating the first address field comprises the steps of:

adding, to the first address field of each i'th one of said n consecutive information items, the contents of a respective i'th element of n consecutive elements in a table (imports), the beginning of said n consecutive elements in said table being determined from a count value (rSymI); and adding n to said count value (rSymI).

24. A method according to claim 23, further comprising the step of, if said retrieved loading instruction is in an seventeenth class of instructions (e.g. LSYM), updating said count value (rSymI) to a value which depends upon said retrieved loading instruction.

25. A method according to claim 16, wherein said retrieved loading instruction is in an eleventh class of loading instructions (e.g. SYMB, SECN, LSECN) within said first class, and wherein said steps of said loading operation comprise the step of updating the first address field of the information item designated by said second pointer (rAddr).

26. A method according to claim 25, wherein said step of updating the first address field comprises the step of adding to said first address field the contents of a pointer (imports, regions, regions) specified by said retrieved loading instruction.

27. A method according to claim 26, wherein said retrieved loading instruction is in a twelfth class instructions (e.g. SYMB) within said eleventh class, wherein said pointer specified by said retrieved loading instruction is given as the i'th element of a table (imports), i being specified in said retrieved loading instruction, said method further comprising the step of maintaining a count value (rSymI) indicating the next element of said table (imports) to use, said steps of said loading operation further comprising the step of storing i+1 as said count value (rSymI) for subsequent use.

28. A method according to claim 27, further comprising the step of, if said retrieved loading instruction is in an seventeenth class of instructions (e.g. LSYM), updating said count value (rSymI) to a value which depends upon said retrieved loading instruction.

29. A method according to claim 16, further comprising the step of, if said retrieved loading instruction is in a thirteenth class of instructions (e.g. CDIS, DTIS, LCDIS, LDTIS), updating the contents of said third pointer (codeA, dataA) to a value which depends on said retrieved loading instruction.

30. A method according to claim 29, wherein said plurality of information items is to be loaded into a plurality of regions of said memory, each of said regions containing contiguously a respective group of at least one of said plurality of information items, each of said regions having a respective designation and a respective start address, and wherein said step of updating the contents of said third pointer (codeA, dataA) comprises the step of storing as said third pointer (codeA, dataA) the start address of one of said regions whose designation is specified in said retrieved loading instruction.

31. A method according to claim 16, further comprising the step of, if said retrieved loading instruction is in a fourteenth class of instructions (e.g. DELTA), adding a value to said second pointer (rAddr) which value is specified in said retrieved loading instruction.

32. A method according to claim 16, further comprising the step of, if said retrieved loading instruction is in a fifteenth class of instructions (e.g. LABS), storing a value specified in said retrieved loading instruction as said second pointer (rAddr).

33. A method according to claim 16, further comprising the step of, if said retrieved loading instruction is in a sixteenth class of instructions (e.g. RPT, LRPT), the step of updating the contents of said first pointer (reloc) to a value which depends upon said retrieved loading instruction.

34. A method according to claim 33, wherein said step of updating the contents of said first pointer (reloc) comprises the step of subtracting a value j from said contents of said first pointer (reloc), j being specified in said retrieved loading instruction.

35. A method according to claim 34, further comprising the steps of:
maintaining a count of the number of repetitions of said step of subtracting; and
inhibiting said step of subtracting after m of such repetitions, m being specified in said retrieved loading instruction.

36. An information storage medium carrying a relocatable file for loading into a computer system memory, said file having a plurality of information items to be loaded into said memory, certain ones of said information items having a respective first address field containing a relocatable address, said file further having a plurality of loading instructions, including a first loading instruction which specifies updating of the first address field of n consecutive ones of said information items, n being specified in said first loading instruction.

37. A medium according to claim 36, wherein said loading instructions further include a second one of said loading instructions, said second loading instruction specifying updating of an address field of m consecutive ones of said information items, m being specified in said second loading instruction.

38. A medium according to claim 37, wherein said first and second loading instructions are of respective different first and second types, and wherein the updating specified by loading instructions of said first type is different from the updating specified by loading instructions of said second type.

39. A medium according to claim 37, wherein said first and second loading instructions have different byte lengths.

40. A medium according to claim 36, wherein said first loading instruction does not specify which of said n consecutive information items are to have an address field updated.

41. A medium according to claim 36, wherein said updating of the first address field of said n consecutive information items as specified by said first loading instruction includes updating the first address field of each given information item in said n consecutive information items to a value which depends upon a respective given element of a table (imports).

42. A medium according to claim 41, wherein said updating of the first address field of a given information item as specified by said first loading instruction includes adding the contents of said respective given element of said table to said first address field of said given information item.

43. A medium according to claim 36, wherein said updating the first address field as specified by said first loading instruction includes updating the first address field of each given information item in said n consecutive information items to a value which depends upon a third pointer (codeA, dataA), the value in said third pointer (codeA, dataA) remaining unchanged for said entire updating of the first address field of n consecutive ones of said information items.

44. A medium according to claim 43, wherein said updating of the first address fields of each given information item as specified by said first loading instruction includes adding of the contents of said third pointer (codeA, dataA) to said first address field of said given information item.

45. A medium according to claim 43, wherein said updating the first address field as specified by said first loading instruction further includes a specification of which of a predetermined plurality of pointers constitutes said third pointer.

46. An information storage medium carrying a relocatable file for loading into a computer system memory, said file having a plurality of information items to be loaded into said memory, certain ones of said information items having a respective first address field containing a relocatable address, said file further having a plurality of loading instructions, a first class of said loading instructions (e.g. DDAT, CODE, DATA, DESC, DSC2, VTBL, SYMR, SYMB, SECN, LSECN) specifying a loading operation on at least one of said information items, said at least one of said information items not being designated in said loading instructions in said first class of loading instructions, said loading instruction identifying the loading operation to be performed on said at least one of said information items.

47. A medium according to claim 46, wherein the loading operation identified by each given loading instruction in a second class of loading instructions (e.g. DDAT, CODE, DATA, DESC, DSC2, VTBL, SYMR) which is within said first class, includes updating the first address field of n consecutive ones of said information items, said n consecutive ones of said information items not being designated in said given loading instruction, n being specified in said given loading instruction.

48. A medium according to claim 47, wherein the updating to be performed if said given loading instruction is in a third class of loading instructions (e.g. DDAT, CODE, DATA, DESC, DSC2, VTBL) which is within said second class, includes updating the first address field of each given information item in said n consecutive ones of said information items to a value which depends upon the prior contents of such first address field and upon a third pointer (codeA, dataA), the value in said third pointer (codeA, dataA) remaining unchanged for said entire updating of the first address field of n consecutive information items.

49. A medium according to claim 47, wherein the updating to be performed if said given loading instruction is in a fourth class of instructions (e.g. DDAT) within said third class, includes adding of the contents of a third pointer (dataA) to said first address field of each of said n consecutive information items;
  said given loading instruction further specifying a value by which a second pointer (rAddr) pointing to said information items is to be incremented prior to said updating.

50. A medium according to claim 47, wherein the updating to be performed includes adding the contents of a third pointer (codeA) to said first address field of each of said n consecutive information items if said given loading instruction is in a sixth class of loading instructions (e.g. CODE) which is within said second class, and adding the contents of a fourth pointer (dataA) to said first address field of each of said n consecutive information items if said given loading instruction is in a seventh class of instructions (e.g. DATA) which is within said second class.

51. A medium according to claim 47, wherein each of said n consecutive information items includes a first word and a second word, wherein said updating to be performed if said given loading instruction is in an eighth class of instructions (e.g. VTBL) within said second class, includes adding the contents of a fourth pointer (dataA) to the first word of each of said n consecutive information items, the loading operation identified by loading instructions in said eighth class of instructions not including any updating of the second word of each of said n consecutive information items.

52. A medium according to claim 47, wherein each of said n consecutive information items further includes a respective second address field containing a relocatable address, wherein the loading operation identified by each given loading instruction in a ninth class of loading instructions (e.g. DESC, DSC2) within said second class, includes adding the contents of a third pointer (codeA) to said first address field of each of said n consecutive information items and adding the contents of a fourth pointer (dataA) to said second address field of each of said n consecutive information items.

53. A medium according to claim 47, wherein the updating to be performed if said given loading instruction is in a tenth class of instructions (e.g. SYMR), includes adding, to the first address field of each i'th one of said n consecutive information items, the contents of a respective i'th element of n consecutive elements in a table (imports).

54. A medium according to claim 46, wherein said loading operation specified by each given loading instruction which is in an eleventh class of loading instructions (e.g. SYMB, SECN, LSECN) within said first class, includes updating the first address field of the information item designated by a second pointer (rAddr) the contents of which are not specified in said loading instruction.

55. A medium according to claim 54, wherein said updating of the first address field includes adding to said first address field the contents of a pointer (imports, regions, regions) specified by said given loading instruction.

56. A medium according to claim 46, wherein said plurality of loading instructions further includes loading instructions in a thirteenth class of instructions (e.g. DCIS, DTIS, LCDIS, LDTIS), each loading instruction in said thirteenth class of instructions specifying that a third one of a predetermined plurality of pointers (codeA, dataA) is to be updated, the type of each loading instruction in said thirteenth class of instructions determining which of said predetermined plurality of pointers (codeA, dataA) is to be said third pointer.

57. A medium according to claim 56, wherein said plurality of information items is to be loaded into a plurality of regions of said memory, each of said regions containing contiguously a respective group of at least one of said plurality of information items, each of said regions having a respective designation and a respective start address,
  and wherein the updating specified by each given loading instruction in said thirteenth class of instructions includes storing as said third pointer (codeA, dataA) the start address of one of said regions whose designation is specified in said given loading instruction.

58. A medium according to claim 46, wherein said loading instructions further include a fourteenth class of instructions (erg. DELTA), each loading instruction in said fourteenth class of instructions specifying a value to be added to a second pointer (rAddr) into said information items.

59. A medium according to claim 46, wherein said loading instructions further include a fifteenth class of instructions (e.g. LABS), each loading instruction in said fifteenth class of instructions specifying a value to be stored as a second pointer (rAddr) into said information items.

60. A medium according to claim 46, wherein said loading instructions further include a sixteenth class of instructions (e.g. RPT, LRPT), each instruction in said sixteenth class of instructions specifying a number of times for which an immediately preceding group of m of said loading instructions are to be repeated.

61. A medium according to claim 60, wherein each instruction in said sixteenth class of instructions further specifies m.

* * * * *